(12) United States Patent
Ballu et al.

(10) Patent No.: US 12,736,163 B2
(45) Date of Patent: Sep. 15, 2026

(54) GARDEN HOSE CONNECTORS

(71) Applicant: EXEL Industries, Epernay (FR)

(72) Inventors: Patrick Ballu, Epernay (FR); Jack Wilson, Birmingham (GB)

(73) Assignee: EXEL Industries, Epernay (FR)

( * ) Notice: Subject to any disclaimer, the term of this patent is extended or adjusted under 35 U.S.C. 154(b) by 0 days.

(21) Appl. No.: 18/763,248

(22) Filed: Jul. 3, 2024

(65) Prior Publication Data

US 2025/0012390 A1 Jan. 9, 2025

(30) Foreign Application Priority Data

Jul. 7, 2023 (GB) ..................................... 2310495
Jun. 18, 2024 (GB) ..................................... 2408753

(51) Int. Cl.
*F16L 19/06* (2006.01)
*F16L 37/091* (2006.01)

(52) U.S. Cl.
CPC ....... *F16L 37/0915* (2016.05); *F16L 2201/10* (2013.01)

(58) Field of Classification Search
CPC . F16L 2201/10; F16L 37/091; F16L 37/0915; F16L 37/0925; F16L 37/0927; F16L 37/098; F16L 37/0982; F16L 37/122; F16L 37/127; F16L 37/1215; F16L 37/133; F16L 37/138; F16L 19/06; F16L 19/065; F16L 19/0653; F16L 47/04; F16L 35/00; F16L 33/226; F16L 33/224; F16L 33/22; F16L 37/0926
See application file for complete search history.

(56) References Cited

U.S. PATENT DOCUMENTS 4,032,177 A 6/1977 Anderson
6,523,862 B1 2/2003 MacDuff
(Continued)

FOREIGN PATENT DOCUMENTS

AU 2013100204 A4 3/2013
AU 2017101400 A4 11/2017
(Continued)

OTHER PUBLICATIONS

De102006013934 Translation (Year: 2007).*
(Continued)

*Primary Examiner* — Aaron M Dunwoody
(74) *Attorney, Agent, or Firm* — Nixon & Vanderhye, PC

(57) ABSTRACT

A garden hose connector arrangement includes a hose connection portion for accepting the end of a garden hose. The hose connection portion includes a hose receiving portion in which is disposed a spigot for receiving the end of a length of hose and a clamping arrangement including a locking nut and deformable claws which surround the spigot and are arranged to be driven into contact with hose carried on the spigot under action of the locking nut. In some examples the claws are arranged so that they extend axially inwardly into the hose receiving portion. In some examples a skirt portion is provided around the spigot so as to define a hose receiving region between the skirt portion and the spigot, and an inspection window is provided in the skirt portion to enable viewing of a hose end when introduced onto the spigot and into the hose receiving region.

21 Claims, 13 Drawing Sheets

(56) References Cited

U.S. PATENT DOCUMENTS

| | | | | |
|---|---|---|---|---|
| 7,021,672 | B2 | 4/2006 | Ericksen | |
| 7,445,247 | B2 | 11/2008 | Ericksen | |
| 8,029,024 | B2 | 10/2011 | Guest | |
| 8,528,942 | B2 | 9/2013 | Giordano | |
| 8,985,641 | B1 | 3/2015 | Barcatta | |
| 9,429,262 | B2 | 8/2016 | Ericksen | |
| 9,604,404 | B2 | 3/2017 | Ericksen | |
| 9,816,654 | B2 | 11/2017 | Hansli | |
| 9,909,701 | B2 | 3/2018 | Guest | |
| 10,221,977 | B2 | 3/2019 | Hennemann | |
| 10,550,972 | B2 | 2/2020 | Goble | |
| 10,724,661 | B2 | 7/2020 | Ericksen | |
| 10,914,414 | B2 | 2/2021 | Hennemann | |
| 11,060,648 | B2 | 7/2021 | Kwak | |
| 11,384,872 | B1 | 7/2022 | Ericksen | |
| 11,668,421 | B2 | 6/2023 | Sauter | |
| 12,072,052 | B2 | 8/2024 | Renner | |
| 12,085,206 | B2 | 9/2024 | Gallou | |
| 2009/0236851 | A1* | 9/2009 | Hampel | F16L 37/244 285/403 |
| 2013/0181446 | A1 | 7/2013 | Le Clinche | |
| 2019/0257454 | A1 | 8/2019 | Crompton | |
| 2020/0326021 | A1 | 10/2020 | Chen | |
| 2023/0265952 | A1 | 8/2023 | Ansell | |
| 2025/0067377 | A1 | 2/2025 | Ravisankar | |

FOREIGN PATENT DOCUMENTS

| | | | |
|---|---|---|---|
| CN | 206669142 | U | 11/2017 |
| CN | 209845874 | U | 12/2019 |
| CN | 210600596 | U | 5/2020 |
| DE | 10233862 | A1 | 2/2004 |
| DE | 102006013934 | A1 | 9/2007 |
| DE | 202007010452 | U1 | 9/2007 |
| DE | 202006020632 | U1 | 4/2009 |
| DE | 202009003386 | U1 | 7/2010 |
| DE | 102009019934 | A1 | 11/2010 |
| DE | 202011103877 | U1 | 9/2011 |
| DE | 202019100428 | U1 | 4/2020 |
| DE | 102022125551 | A1 | 4/2024 |
| EP | 0972155 | A1 | 1/2000 |
| EP | 1746329 | A2 | 1/2007 |
| EP | 1788292 | A2 | 5/2007 |
| EP | 1816385 | A2 | 8/2007 |
| EP | 1837581 | A2 | 9/2007 |
| EP | 1899635 | A1 | 3/2008 |
| EP | 1933074 | A2 | 6/2008 |
| EP | 2192338 | A2 | 6/2010 |
| EP | 2224157 | A1 | 9/2010 |
| EP | 2228581 | A2 | 9/2010 |
| EP | 2423554 | A1 | 2/2012 |
| EP | 2494255 | A2 | 9/2012 |
| EP | 2508784 | A1 | 10/2012 |
| EP | 2615348 | A2 | 7/2013 |
| EP | 2644959 | A2 | 10/2013 |
| EP | 2759753 | A1 | 7/2014 |
| EP | 3092431 | A1 | 11/2016 |
| EP | 3543579 | A1 | 9/2019 |
| EP | 3608576 | A1 | 2/2020 |
| EP | 3677824 | A1 | 7/2020 |
| EP | 3743647 | A1 | 12/2020 |
| EP | 3771855 | A1 | 2/2021 |
| EP | 4051942 | A1 | 9/2022 |
| EP | 3956596 | B1 | 1/2023 |
| EP | 3 749 885 | B1 | 3/2023 |
| EP | 3956594 | B1 | 3/2023 |
| EP | 4257859 | A1 | 10/2023 |
| FR | 3024207 | A1 | 1/2016 |
| GB | 2597493 | A | 2/2022 |
| GB | 2597494 | A | 2/2022 |
| KR | 20140148119 | A | 12/2014 |
| WO | 9841791 | A1 | 9/1998 |
| WO | 2004106794 | A2 | 12/2004 |
| WO | 2005124216 | A1 | 12/2005 |
| WO | 2010127815 | A1 | 11/2010 |
| WO | 2011099186 | A1 | 8/2011 |
| WO | 2011099519 | A1 | 8/2011 |
| WO | 2012139969 | A1 | 10/2012 |
| WO | 2012162554 | A1 | 11/2012 |
| WO | 2013058358 | A1 | 4/2013 |
| WO | 2014018860 | A1 | 1/2014 |
| WO | 2014144026 | A2 | 9/2014 |
| WO | 2015131932 | A1 | 9/2015 |
| WO | 2016091295 | A1 | 6/2016 |
| WO | 2016091296 | A1 | 6/2016 |
| WO | 2016091297 | A1 | 6/2016 |
| WO | 2018042904 | A1 | 3/2018 |
| WO | 2018085327 | A1 | 5/2018 |
| WO | 2018157994 | A1 | 9/2018 |
| WO | 2018157995 | A1 | 9/2018 |
| WO | 2019145057 | A1 | 8/2019 |
| WO | 2019145088 | A1 | 8/2019 |
| WO | 2019150404 | A1 | 8/2019 |
| WO | 2019179641 | A1 | 9/2019 |
| WO | 2020001029 | A1 | 1/2020 |
| WO | 2020211961 | A1 | 10/2020 |
| WO | 2020211962 | A1 | 10/2020 |
| WO | 2020211963 | A1 | 10/2020 |
| WO | 2020211964 | A1 | 10/2020 |
| WO | 2020211965 | A1 | 10/2020 |
| WO | 2020229716 | A2 | 11/2020 |
| WO | 2022112178 | A1 | 6/2022 |
| WO | 2022199875 | A1 | 9/2022 |
| WO | 2023225695 | A1 | 11/2023 |
| WO | 2024069172 | A1 | 4/2024 |
| WO | 2024121538 | A1 | 6/2024 |
| WO | 2024171595 | A1 | 8/2024 |

OTHER PUBLICATIONS

"The Speedfit Science—How our fittings work", YouTube, accessed Feb. 2023, 1 page, https://www.youtube.com/watch?v=v6kRm3KKCQo.

Search Report for GB Application No. 2310495.3 dated Dec. 28, 2023, 4 pages.

European Search Report in Application No. 24186816.5, dated Mar. 20, 2025.

* cited by examiner 52
52
4
5
53

GARDEN HOSE CONNECTORS

CROSS REFERENCE TO RELATED APPLICATIONS

This application claims priorities to GB Patent Application No. 2310495.3 filed Jul. 7, 2023, and GB Patent Application No. 2408753.8 filed Jun. 18, 2024, the entire contents of which are hereby incorporated by reference.

FIELD

This invention relates to garden hose connectors, for example garden hose connectors as are found in garden hose fittings.

BACKGROUND

Garden hose connectors are used for mounting the end of a length of hose to a component. In some cases a garden hose is mounted directly to a component such as a tap, a tank, a watering outlet such as a hose gun or so on. More typically a garden hose is mounted to a hose fitting which itself facilitates connection of the hose to another component.

One existing type of garden hose connector comprises a hose receiving portion in which is disposed a spigot for receiving the end of a length of hose and a clamping arrangement for clamping the hose to the spigot. The clamping arrangement comprises a locking nut and a plurality of forward facing deformable claws which surround the spigot. When mounting a hose it is introduced between the ends of the claws and the spigot and on to the spigot. The claws are arranged to be driven into contact with hose carried on the spigot under action of the locking nut such that a carried hose is clampable between the claws and the spigot.

One issue that can arise with such a hose connector is that it can be difficult to feed the hose onto the spigot, especially when hoses with different wall thickness are used. Sometimes users struggle to mount the hose. Other times users may damage the joins between the claws and the remainder of the connector in an effort to mount the hose.

Further with these types of connector it is necessary to put the locking nut onto the hose before the hose is fitted to the spigot so that the nut is ready to be tightened onto the connector. This is a further step for a user to work out/remember.

Thus it would be desirable to provide alternative forms of garden hose connectors.

SUMMARY OF EXAMPLE EMBODIMENTS

According to one aspect of the present invention there is provided a garden hose connector arrangement comprising a hose connection portion for accepting the end of a garden hose, the hose connection portion comprising:

a hose receiving portion in which is disposed a spigot for receiving the end of a length of hose; and a clamping arrangement comprising a locking nut and a plurality of deformable claws which surround the spigot and are arranged to be driven into contact with hose carried on the spigot under action of the locking nut such that a carried hose is clampable between the claws and the spigot, wherein the hose connection portion has a hose introduction end via which hose is introduced onto the spigot in use, and the claws have first end portions via which they are joined to the hose connection portion and second engaging end portions for biting into a carried hose and the first end portions of the claws are closer to the hose introduction end of the hose connection portion than are the second end portions of the claws, so that the claws project inwardly into the hose connection portion.

The garden hose connector arrangement may be a garden hose fitting and further comprise a connector mounting portion for accepting a connector portion of a component to be connected to the hose fitting.

According to another aspect of the present invention there is provided a garden hose fitting comprising a hose connection portion for accepting the end of a garden hose and a connector mounting portion for accepting a connector portion of a component to be connected to the hose fitting, the hose connection portion comprising:

a hose receiving portion in which is disposed a spigot for receiving the end of a length of hose; and a clamping arrangement comprising a locking nut and a plurality of deformable claws which surround the spigot and are arranged to be driven into contact with hose carried on the spigot under action of the locking nut such that a carried hose is clampable between the claws and the spigot, wherein the hose connection portion has a hose introduction end via which hose is introduced onto the spigot in use, and the claws have first end portions via which they are joined to the hose connection portion and second engaging end portions for biting into a carried hose and the first end portions of the claws are closer to the hose introduction end of the hose connection portion than are the second end portions of the claws, so that the claws project inwardly into the hose connection portion.

This facilitates mounting of a hose end on the spigot from a direction such that the hose end passes the joined ends of the claws before reaching the engaging ends of the claws. This means that claws will tend to be naturally forced radially outwards by the end of the hose if they happen to initially sit at a circumference that is smaller than that of the outer circumference of the hose end. This type of situation can occur when a connector is first used and/or if a hose with a relatively thick hose wall is used in a connector after it has been used with a hose with a relatively thin hose wall.

In one set of embodiments, a skirt portion is provided around the spigot so as to define a hose receiving region between the skirt portion and the spigot, and an inspection window is provided in the skirt portion to enable viewing of a hose end when introduced onto the spigot and into the hose receiving region.

According to a third aspect of the present invention there is provided a garden hose connector arrangement comprising a hose connection portion for accepting the end of a garden hose, the hose connection portion comprising: a hose receiving portion in which is disposed a spigot for receiving the end of a length of hose; and a clamping arrangement comprising a locking nut and a plurality of deformable claws which surround the spigot and are arranged to be driven into contact with hose carried on the spigot under action of the locking nut such that a carried hose is clampable between the claws and the spigot, wherein the hose connection portion has a hose introduction end via which hose is introduced onto the spigot in use, a skirt portion is provided around the spigot so as to define a hose receiving region between the skirt portion and the spigot, and an inspection window is provided in the skirt portion to enable viewing of a hose end when introduced onto the spigot and into the hose receiving region.

The garden hose connector arrangement may be a garden hose fitting and further comprise a connector mounting portion for accepting a connector portion of a component to be connected to the hose fitting.

According to a fourth aspect of the present invention there is provided a garden hose fitting comprising a hose connection portion for accepting the end of a garden hose and a connector mounting portion for accepting a connector portion of a component to be connected to the hose fitting, the hose connection portion comprising:

a hose receiving portion in which is disposed a spigot for receiving the end of a length of hose; and a clamping arrangement comprising a locking nut and a plurality of deformable claws which surround the spigot and are arranged to be driven into contact with hose carried on the spigot under action of the locking nut such that a carried hose is clampable between the claws and the spigot, wherein the hose connection portion has a hose introduction end via which hose is introduced onto the spigot in use, a skirt portion is provided around the spigot so as to define a hose receiving region between the skirt portion and the spigot, and an inspection window is provided in the skirt portion to enable viewing of a hose end when introduced onto the spigot and into the hose receiving region.

The provision of an inspection window can assist a user in mounting a hose in the connection portion as it helps ensure that the hose is properly inserted onto the spigot. If a hose is not properly mounted on to the spigot a poor connection can result. Sometimes users can struggle to correctly mount a hose or more particularly struggle to know whether/when the hose is properly mounted. This aspect of users' problems with fitting hoses became apparent when testing connection portions with "inwardly projecting claws" as defined above, but is relevant to hose connector portions including spigots irrespective of the details of the clamping mechanism, and is for example relevant to and beneficial when provided in the existing type of garden hose connector described in the introduction above.

The inspection window may be provided as an aperture in the skirt portion. In an alternative, the inspection window may be provided as an transparent or translucent portion in the material of the skirt portion.

Preferably the inspection window is provided in the skirt portion in a location that is towards a proximal end of the spigot. This can help a user see that an inserted hose is fully on the spigot.

The spigot may comprise a stop region which the end of a fully mounted hose should reach when properly mounted and the inspection window may be aligned with the stop region.

In one set of embodiments of the garden hose connector arrangement based on the third aspect of the present invention and in one set of embodiments of the garden hose fitting based on the fourth aspect of the present invention, the claws have first end portions via which they are joined to the hose connection portion and second engaging end portions for biting into a carried hose and the first end portions of the claws are closer to the hose introduction end of the hose connection portion than are the second end portions of the claws, so that the claws project inwardly into the hose connection portion.

In an alternative set of embodiments of the garden hose connector arrangement based on the third aspect of the present invention and in an alternative set of embodiments of the garden hose fitting based on the fourth aspect of the present invention, the claws have first end portions via which they are joined to the hose connection portion and second engaging end portions for biting into a carried hose and the second end portions of the claws are closer to the hose introduction end of the hose connection portion than are the first end portions of the claws, so that the claws project towards the hose introduction end of the hose connection portion.

This corresponds to the arrangement of claws in the existing type of garden hose connector described in the introduction with outwardly projecting/forward facing claws.

Many of the following sub-features primarily relate to connector arrangements and fittings with inwardly projecting claws, but at least some can also relate to those with outwardly projecting/forward facing claws.

The claws may be carried on the locking nut. In such a case, preferably, the clamping arrangement comprises a sleeve member which comprises the claws.

The locking nut may be rotatably mounted on the sleeve member for rotation around the axis of the sleeve member.

This can allow the sleeve member and hence the claws to not rotate as the locking nut is rotated-say so that the claws may bite into and not rotate relative to a carried hose whilst the locking nut is being rotated.

The locking nut and sleeve member may be arranged so that as the locking nut is tightened onto a main body of the hose connection portion, the sleeve member is driven axially relative to the main body of the hose connection portion whilst the locking nut is able to rotate relative to the sleeve member.

The locking nut and sleeve may be mounted to one another so as to be held against relative axial movement whilst being able to rotate relative to one another.

The locking nut may be captured on the sleeve member. Together these parts can be termed a locking assembly.

The sleeve member may comprise a collar portion to which the claws are joined.

Each claw may be joined to the collar portion via a respective plastic hinge.

Each claw may be joined to the collar portion via a respective plastic hinge portion and arranged to bend around the plastic hinge portion into gripping contact with a carried hose.

The sleeve member may be of one piece. The claws and collar portion may be of one piece, say of one piece of plastics material.

The claws and hose receiving portion may be arranged so that axial movement of the claws further into the hose receiving portion tends to drive the claws radially inwards towards the spigot.

Each claw may comprise at least one tooth portion for biting into a carried hose.

The at least one tooth portion may be arranged as a barb. This can be such that as an attempt is made to pull a hose from the hose connection portion the tooth tends to bite more into the hose which in turn can increase the force needed to extract the hose.

Each claw may have a camming surface arranged for interaction with a corresponding camming surface of the hose receiving portion, for driving the claw radially inwards towards the spigot as the claw is driven axially into the hose receiving portion under action of the locking nut.

The garden hose connector arrangement may comprise a threaded stem portion on which the locking nut is arranged for threaded engagement. The threaded stem portion may comprise the skirt portion. The inspection window may be at least partially provided in the threaded portion of the threaded stem portion.

The camming surface of the hose receiving portion may comprise a slope portion which is inclined to the axis of the hose receiving portion.

The angle of inclination of the slope relative to the axis of the hose receiving portion may be in the range of 10 degrees to 50 degrees. In some instances a range of 40 to 60 degrees may be preferred. In other instances a lower angle-say 20 to 35 degrees may be preferred.

The camming surface of the hose receiving portion may comprise at least one guide portion for resisting lateral movement of the claws as the locking nut is tightened and the claws move axially along the camming surface.

The at least one guide portion may comprise at least one guiding channel.

The at least one guiding channel may have a flared mouth portion for receiving and then guiding the claws into a correct angular position relative to the main body of the connection portion as the locking assembly including the claws is mounted onto the main body.

The connector mounting portion may comprise part of a push fit connector system for accepting and retaining a part of the connector portion of a component to be connected to the hose fitting. The connector mounting portion may comprise the female part of push fit connector system, such as a "quick-connect" system widely used in Europe and elsewhere, for accepting a corresponding male part on another component.

In a quick-connect connection system, one part is a male part and carries at least one O-ring seal, the other part is female and includes a bore arranged to accept the male part with the O-ring seal sealing against a wall of the bore. The female part further comprises a plurality of engaging fingers arranged to move resiliently between an extended position for capturing the male part and a retracted position allowing insertion and removal of the male part in the receiving bore. As the male part is introduced into the receiving bore the engaging fingers are driven into the retracted position and return to the extended position once the two parts are fully engaged. A release mechanism is provided for releasing the two parts. When operated this retracts the engaging fingers so that the male part may be removed.

The present fitting may comprise the female parts of a quick-connect connection system—ie at least one of:

- a bore arranged to accept the male part;
- a plurality of engaging fingers arranged to move resiliently between an extended position for capturing the male part and a retracted position allowing insertion and removal of the male part in the receiving bore; and
- a release mechanism for releasing the two parts, which when operated retracts the engaging fingers so that the male part may be removed.

In alternatives the connector mounting portion may comprise a threaded connector portion for connection with a corresponding threaded connector portion on another component. Such a system is more commonly used, for example, in the US.

The sleeve member may comprise a hose expansion retainer. This may extend axially beyond the extent of the locking nut for guarding against expansion of a carried hose in the region where this meets the hose connector portion.

The expansion retainer can also help protect against undesirable excessive bending of the hose in the region of the hose connector portion.

The locking nut may be assembled on the sleeve member by elastic deformation of the sleeve member and/or the locking nut. The locking nut and sleeve may be manufactured as one component, say by additive manufacturing.

The connector arrangement typically will be arranged to accept hoses of a plurality of different sizes, in particular different hose wall thicknesses.

According to another aspect of the present invention there is provided a garden hose connector arrangement assembly comprising a garden hose connector arrangement as defined above with a length of hose mounted in the hose receiving portion.

According to another aspect of the present invention there is provided a garden hose fitting assembly comprising a garden hose fitting as defined above with a length of hose mounted in the hose receiving portion.

Note that, in general terms and with any necessary modifications in wording, all of the further features defined above following any aspect of the invention above are applicable as further features of all other aspects of the invention defined above. These further features are not restated after each aspect of the invention merely for the sake of brevity.

BRIEF DESCRIPTION OF THE DRAWINGS

Embodiments of the present invention will now be described, by way of example only, with reference to the accompanying drawings in which.

DETAILED DESCRIPTION

Figure 1:
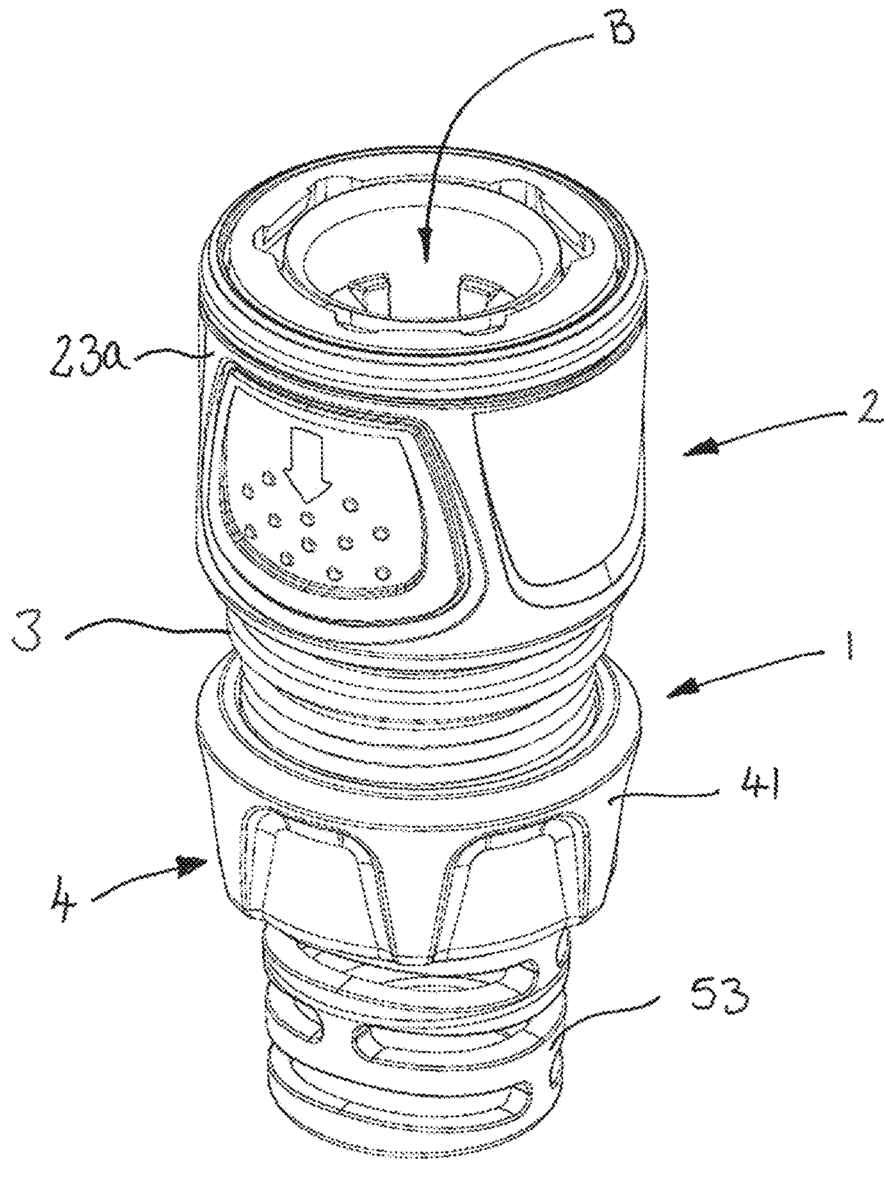
FIG. 1 schematically shows a garden hose fitting.
Figure 2:
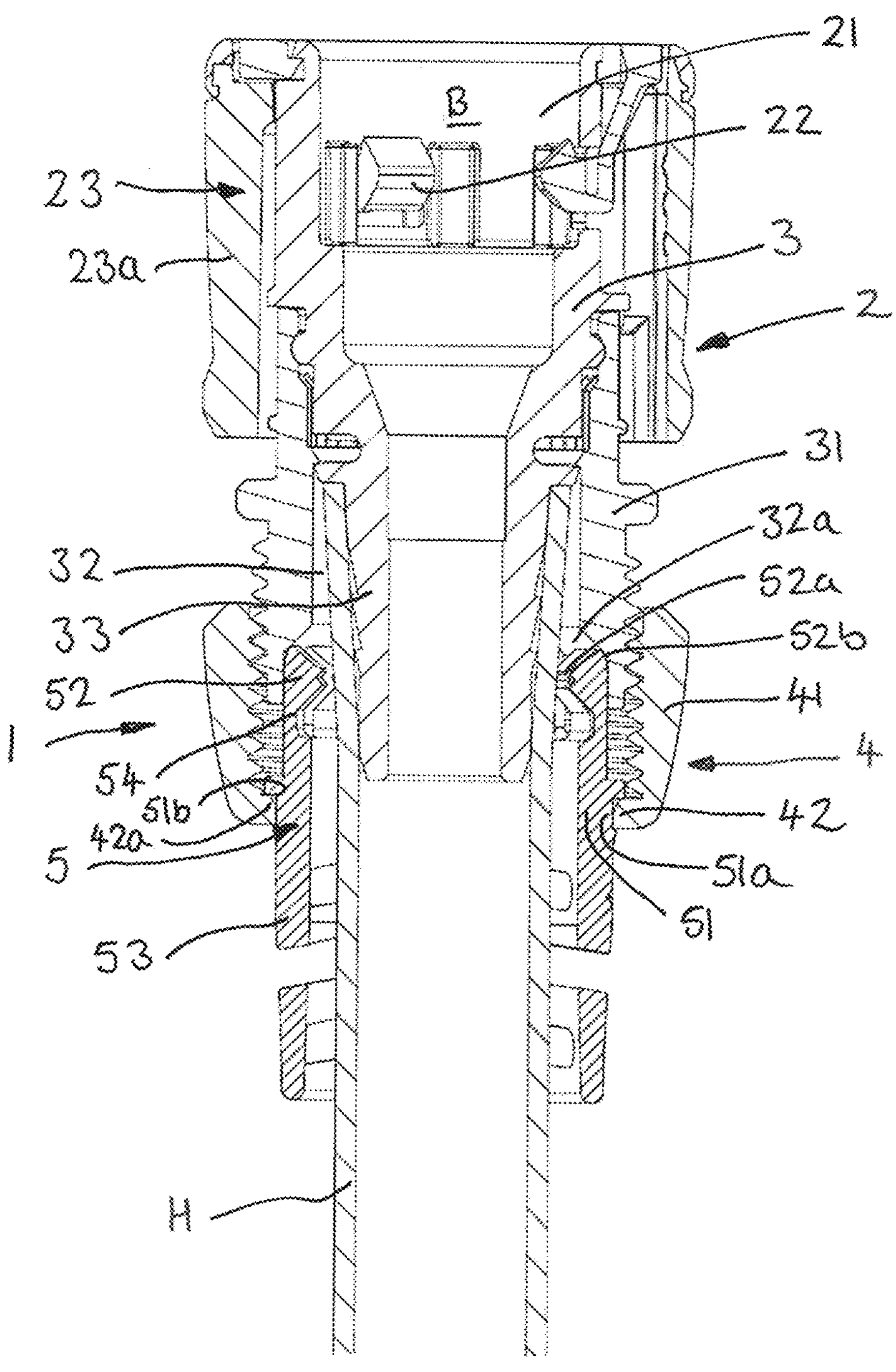
FIG. 2 is a sectional view of the garden hose fitting shown in FIG. 1 mounted on a hose.

FIGS. 1 and 2 show a garden hose fitting for mounting on the end of a length of garden hose H (see FIG. 2) and for use in connecting the hose H to another component such as a garden tap, or a hose outlet device such as a hose gun or so on.

The garden hose fitting comprises a hose connection portion 1 which is arranged to receive the end of a length of hose H and a connector mounting portion 2 arranged to accept a connector portion of a component to be connected to the hose fitting.

The garden hose fitting has a main body 3 having a bore B through which fluid can pass from a component connected to the hose fitting to a hose connected to the hose fitting and vice versa. The hose connection portion 1 is provided towards a first end of the main body 3 and the connector mounting portion 2 is provided towards a second end of the main body 3.

The garden hose fitting comprises a locking assembly 4 which is threadingly mounted on a threaded stem portion 31 provided towards the first end of the main body 3.

Figures 3, 4:
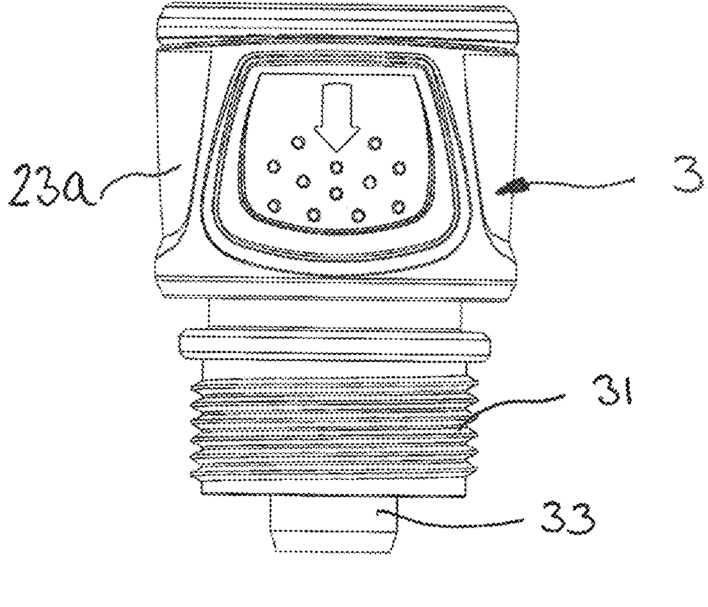
FIG. 3 schematically shows a main body of the garden hose fitting of FIGS. 1 and 2.
FIG. 4 schematically shows a locking assembly of the garden hose fitting of FIGS. 1 and 2.

The main body 3 is shown in isolation in FIG. 3 and the locking assembly 4 is shown in isolation in FIG. 4.

A hose receiving portion 32 is defined within the threaded stem portion 31 and a spigot 33 on which a hose end H can be mounted is disposed in the hose receiving portion 32. The threaded stem portion 31 comprises a skirt portion S which is provided around the spigot 33 so as to define a hose receiving region R between the skirt portion S and the spigot 33.

In the present embodiment the hose connection portion 1 comprises the threaded stem portion 31, the hose receiving portion 32, the spigot 33 and the locking assembly 4.

The locking assembly 4 comprises locking nut 41 with a thread which is arranged for threaded engagement with the threaded stem portion 31 and a sleeve member 5. The sleeve member 5 has a generally circular cross-section. The locking nut 41 is mounted for rotation on the sleeve member 5 about an axis of the sleeve member 5. On the other hand the locking nut 41 is mounted on the sleeve member 5 so as to resist relative axial movement of the locking nut 41 relative to the sleeve member 5 as the locking nut 41 is tightened onto the threaded stem portion 31.

The sleeve member 5 comprises a collar portion 51 to which are joined a plurality of hose engaging claws 52 and an expansion retainer portion 53.

The collar portion 51 comprises a peripheral recess 51*a* in which is disposed a circular lip portion 42 of the locking nut 41 such that as the locking nut 41 is rotated about its axis (and the axis of the sleeve member 5) the lip portion 42 runs in the recess 51*a*. Respective edges 42*a*, 51*b* of the lip portion 42 and recess 51*a* abut one another to resist relative axial movement of the sleeve member 5 and locking nut 41.

Each of the hose engaging claws 52 is joined to the collar portion 51 via a respective plastic hinge portion 54 which allows the claws 52 to be deformed radially inwards and outwards from a rest position. The claws 52 are arranged in a ring and surround the spigot 33 when the locking assembly 4 is mounted on the main body 3. Thus in such a state the claws 52 can be deformed inwards towards the spigot 33 for gripping a carried hose H.

In the present embodiment the sleeve member 5 is of one piece, say a moulded plastics material one piece component.

Each of the claws 52 comprises at least one respective tooth portion 52*a* for biting into the hose wall of a carried hose H.

Each of the claws 52 comprises a camming surface 52*b*, which in this embodiment faces away from the tooth portion 52*a*, which is arranged for interaction with a corresponding camming surface 32*a* provided in the hose receiving portion 32. The camming surfaces 52*b*, 32*a* are arranged so that as the locking assembly 4 and hence claws 52 are moved axially into the hose receiving portion 32 under action of the locking nut 41, the claws 52 are forced radially inwards towards the spigot 33. Thus where a hose is carried on the spigot 33, the claws 52 are driven into the wall of the carried hose as the locking nut 41 is tightened onto the main body 3.

As the claws 52 bite into a carried hose H they will tend to become locked against rotation relative to the hose and hence relative to the main body 3 of the fitting whilst the locking nut 41 is able to be turned relative to the claws 52 and sleeve member 5 as a whole and hence relative to the remainder of the fitting.

Figure 5:
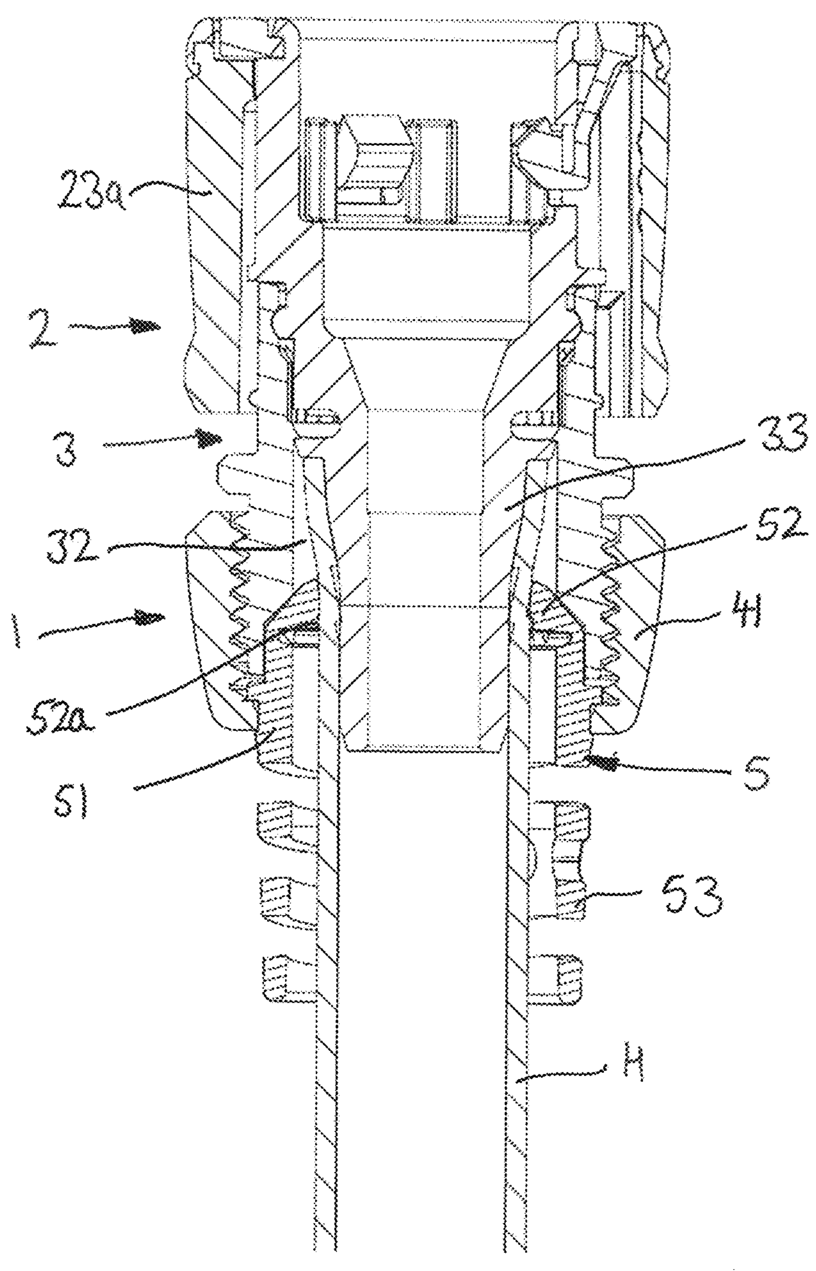
FIG. 5 is a sectional view of the garden hose fitting shown in FIGS. 1 and 2 mounted on a hose with a nut of the fitting tightened to secure the hose.

FIG. 5 shows the garden hose fitting with the locking nut 41 tightened and the claws 52 forced radially inwards and the respective tooth portions 52*a* pressed into gripping contact with the carried hose H.

The locking nut 41, claws 52 and camming surfaces 32*a* in the receiving portion can be considered to comprise a clamping arrangement for clamping a carried hose H on the spigot 33.

The claws 52 are arranged so that they extend axially inwardly into the hose receiving portion 32 when the locking assembly 4 is mounted on the main body 3. The ends of the claws 52 which are joined (via the hinge portions 54) to the hose connection portion 1, specifically the locking assembly 5, are closer to the end of hose connection portion in which the hose is introduced than are the hose engaging parts, ie the teeth 52*a*, of the claws 52.

This makes it easier to insert a hose end. The claws 52 can tend to be easily splayed outwardly by the end of the hose as it is inserted if needed.

Further the hose H may be mounted on the fitting whilst the locking assembly 4 is mounted on the main body 3 simply by introducing the hose end into the hose introduction end of the fitting-ie through the expansion retainer portion 53, in this embodiment.

This is in distinction to existing garden hose connectors as mentioned in the introduction where a locking nut needs to be separately put onto the hose before the hose end is fitted onto a spigot.

The expansion retainer portion 53 is arranged to extend around and along a length of hose H away from the locking nut 41 when the hose H is mounted in the hose connector portion. This can help protect the mounted hose H from undesirable expansion in this region which otherwise can lead to hose or hose connection failure. Similarly the expansion retainer portion 53 can help avoid excessive bending of the hose H in the region where this meets the fitting, which can help avoid dislodging of hose from the spigot 33. It can be noted that the expansion retainer portion 53 extends a significant distance beyond the distal end of the spigot 33 even when the locking nut 41 is fully tightened onto the threaded stem portion 31.

In the present embodiment, the connector mounting portion 2 comprises the female parts of a "quick-connect" garden hose connection system. That is to say the connector mounting portion 2 is arranged to accept the male part of a quick-connect connector.

The connector mounting portion 2 comprises a bore 21 arranged to accept the male part so that an O-ring seal on the male part may seal against a wall of the bore 21. The connector portion further comprises a plurality of engaging fingers 22 arranged to move resiliently between an extended position (as shown in FIG. 2) for capturing the male part and a retracted position allowing insertion and removal of the male part in the receiving bore 21. With this construction as the male part is introduced into the receiving bore 21 the engaging fingers 22 are driven into the retracted position and return to the extended position once the two parts are fully engaged.

A release mechanism 23 is provided for releasing the two parts. The release mechanism 23 comprises a spring loaded sleeve 23*a*. When the sleeve 23*a* is operated this retracts the engaging fingers 22 so that the male part may be removed.

Figure 6:
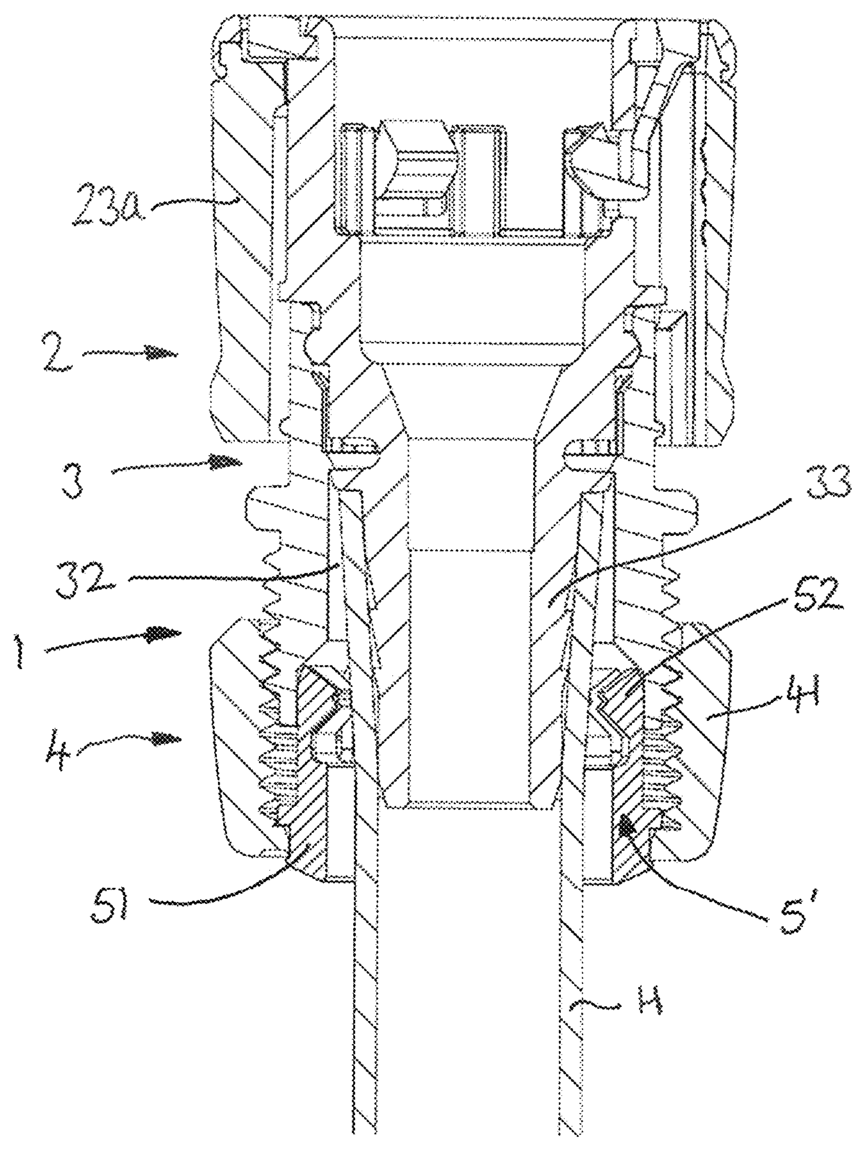
FIG. 6 is a sectional view of a first alternative garden hose fitting mounted on a hose.

FIG. 6 shows a first alternative garden hose fitting which is similar to that shown in and described with reference to FIGS. 1 to 5. Description of the parts of the first alternative garden hose fitting in common with the hose fitting of FIGS. 1 to 5 is not given herein for the sake of brevity. The difference between the garden hose fitting of FIG. 6 and that of FIGS. 1 to 5 is that an alternative sleeve member 5' is provided. This alternative sleeve member 5' is the same as the sleeve member 5 of FIGS. 1 to 5 except that it does not include a expansion retainer portion. Thus the modified sleeve member 5' comprises a collar portion 51 and a plurality of claws 52 joined to the collar portion 51 via respective plastic hinge portions 54. In this case the sleeve member 5' terminates just proud of the outer end of the locking nut 41.

Figure 7:
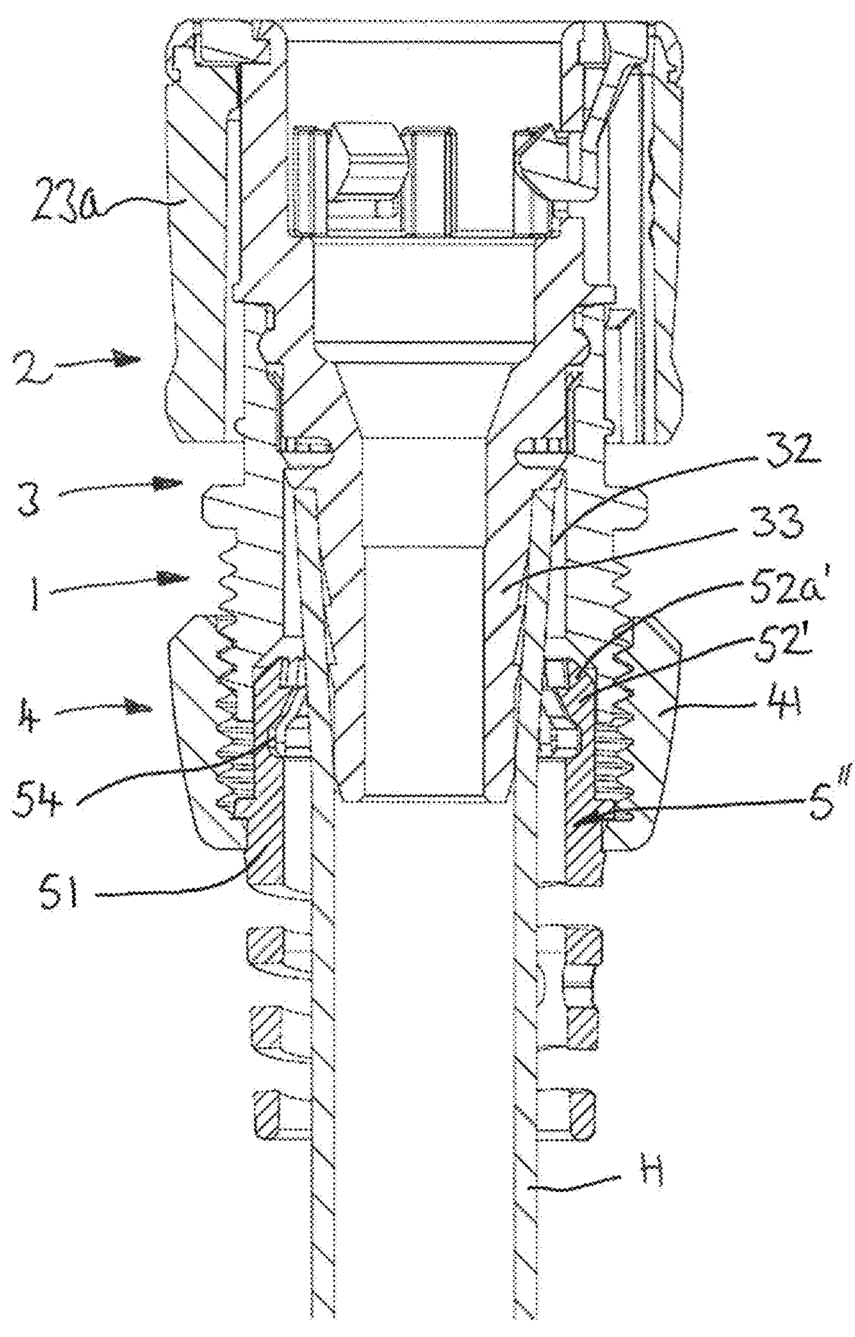
FIG. 7 is a sectional view of a second alternative garden hose fitting mounted on a hose.

FIG. 7 shows a second alternative garden hose fitting which is similar to that shown in and described with reference to FIGS. 1 to 5. Description of the parts of the second alternative garden hose fitting in common with the hose fitting of FIGS. 1 to 5 is not given herein for the sake of brevity. The difference between the garden hose fitting of FIG. 7 and that of FIGS. 1 to 5 is that a second alternative sleeve member 5" is provided. This modified sleeve member 5" is the same as the sleeve member 5 of FIGS. 1 to 5 except that it comprises a set of modified claws 52'. Thus the second alternative sleeve member 5" comprises a collar portion 51 and a plurality of modified claws 52' joined to the collar portion 51 via respective plastic hinge portions 54.

Each modified claw 52' comprises at least one, and in this embodiment, two tooth portions 52*a*' as in the sleeved member 5 of the fitting of FIGS. 1 to 5. However, in the modified claws 52', each tooth portion 52*a*' is arranged as a barb such that it snags the wall of a carried hose and tends to dig into the wall of a carried hose H when a forced is exerted on the hose H relative to the fitting which would be such as to tend to remove the hose. Further as a carried hose H is so pulled, the force required to extract the hose H will tend to increase.

The engaging portion of the modified claws 52' and in particular the respective tooth portions 52*a*' are inclined so as to project inwardly into the hose receiving portion 32 away from the end of the hose receiving portion 32 via which hose H is introduced. This arrangement provides the barb effect in the present alternative.

Figure 8:
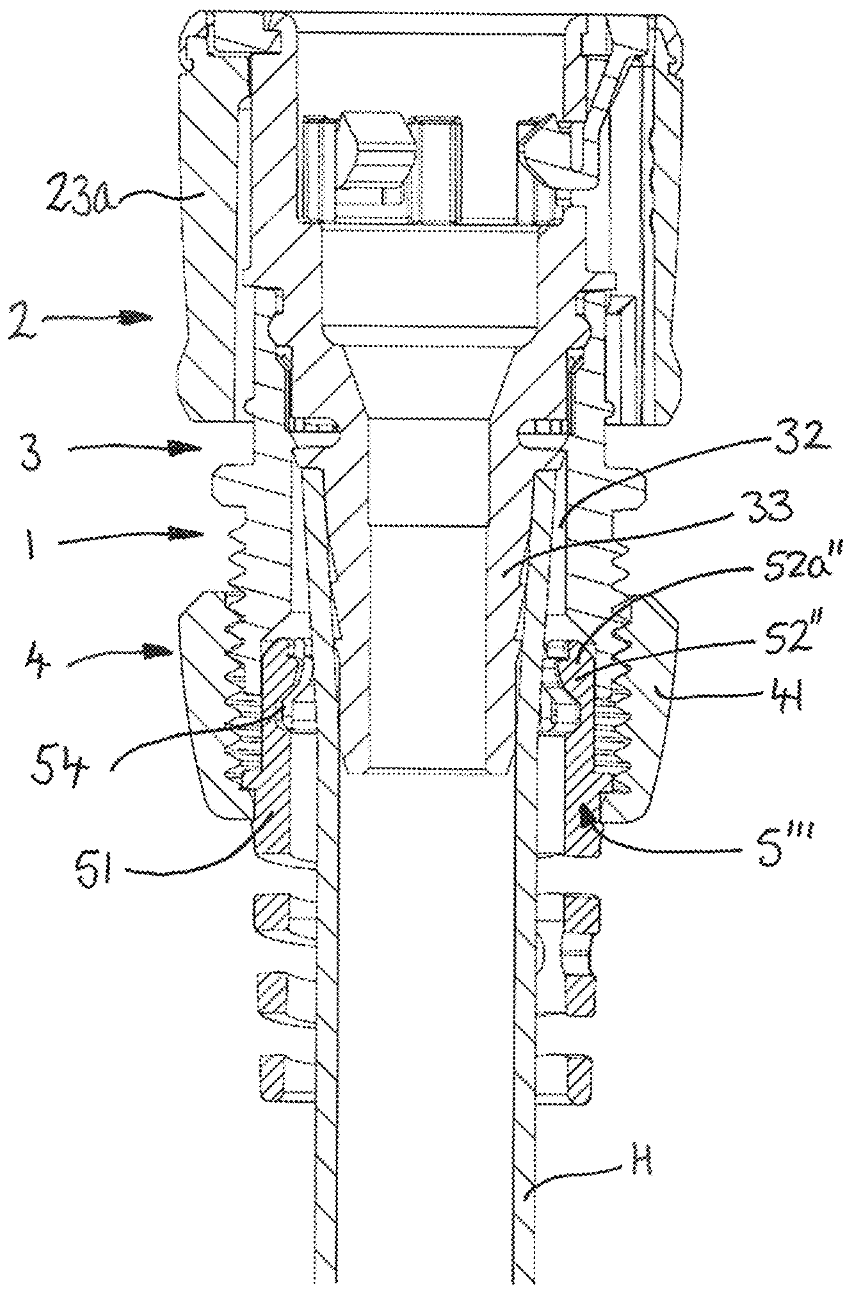
FIG. 8 is a sectional view of a third alternative garden hose fitting mounted on a hose.

FIG. 8 shows a third alternative garden hose fitting which is similar to that shown in and described with reference to FIG. 7. The difference between the garden hose fitting of FIG. 8 and that of FIG. 7 is that a third alternative sleeve member 5" is provided. This modified sleeve member 5" is the same as the second alternative sleeve member 5" of FIG. 7 except that it comprises an alternative set of modified claws 52". Thus the third alternative sleeve member 5'" comprises a collar portion 51 and a plurality of alternative modified claws 52" joined to the collar portion 51 via respective plastic hinge portions 54.

Each alternative modified claw 52" comprises at least one, and in this embodiment, two tooth portions 52*a*" as in the sleeved member 5" of the fitting of FIG. 7. As in the case of the modified claws 52' of FIG. 7, in the alternative modified claws 52" of FIG. 8, each tooth portion 52*a*" is arranged as a barb such that it snags the wall of a carried hose and tends to dig into the wall of a carried hose H when a forced is exerted on the hose H relative to the fitting which would be such as to tend to remove the hose. Further as a carried hose H is so pulled, the force required to extract the hose H will tend to increase.

Further again, the engaging portion of the alternative modified claws 52" and in particular the respective tooth portions 52*a*" are inclined so as to project inwardly into the hose receiving portion 32 away from the end of the hose receiving portion 32 via which hose H is introduced. And again this arrangement provides the barb effect in the present alternative.

However in the alternative of FIG. 8, the respect tooth portions 52*a*" have a softer or more rounded end portion that contacts with the hose H. This end portion is selected so as to provide engagement with the hose H whilst aiming to reduce the risk of damage to a carried hose H. The aim is to grip and perhaps dig into and deform the wall of the hose H whilst not cutting into the material of the wall of the hose H.

Figure 9:
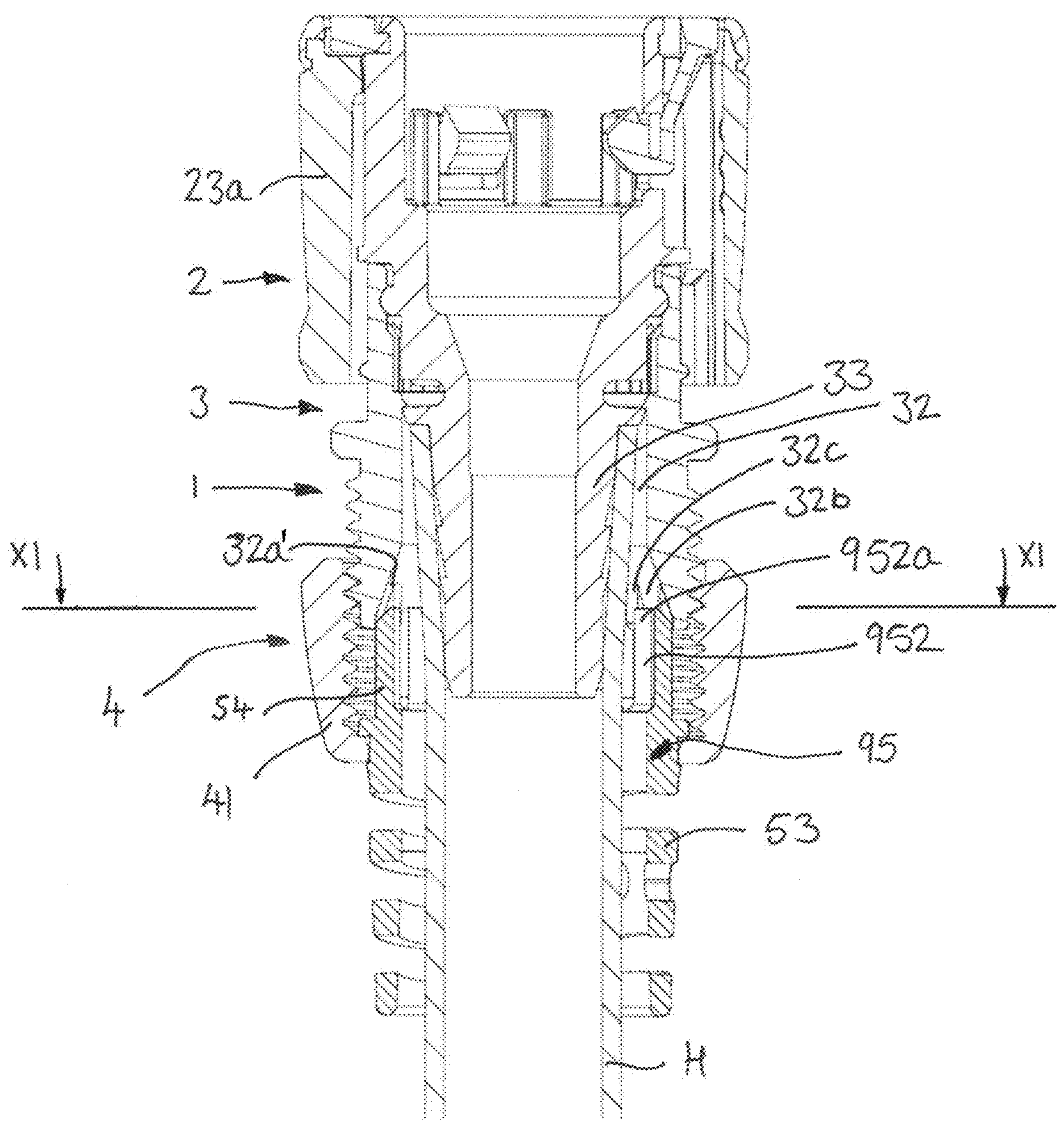
FIG. 9 is a sectional view of a fourth alternative garden hose fitting mounted on a hose.
Figure 10:
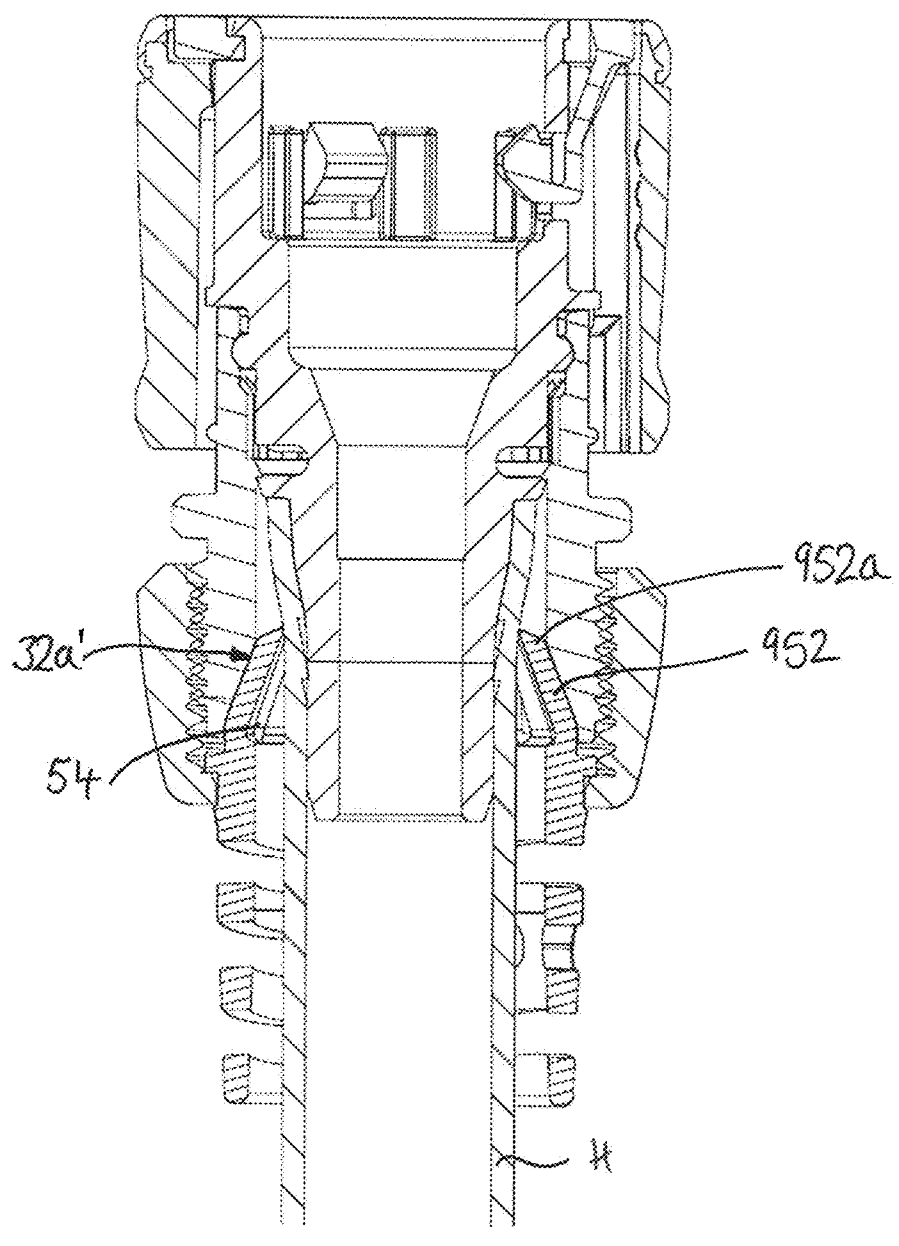
FIG. 10 is a sectional view of the garden hose fitting shown in FIG. 9 mounted on a hose with a nut of the fitting tightened to secure the hose.
Figure 11:
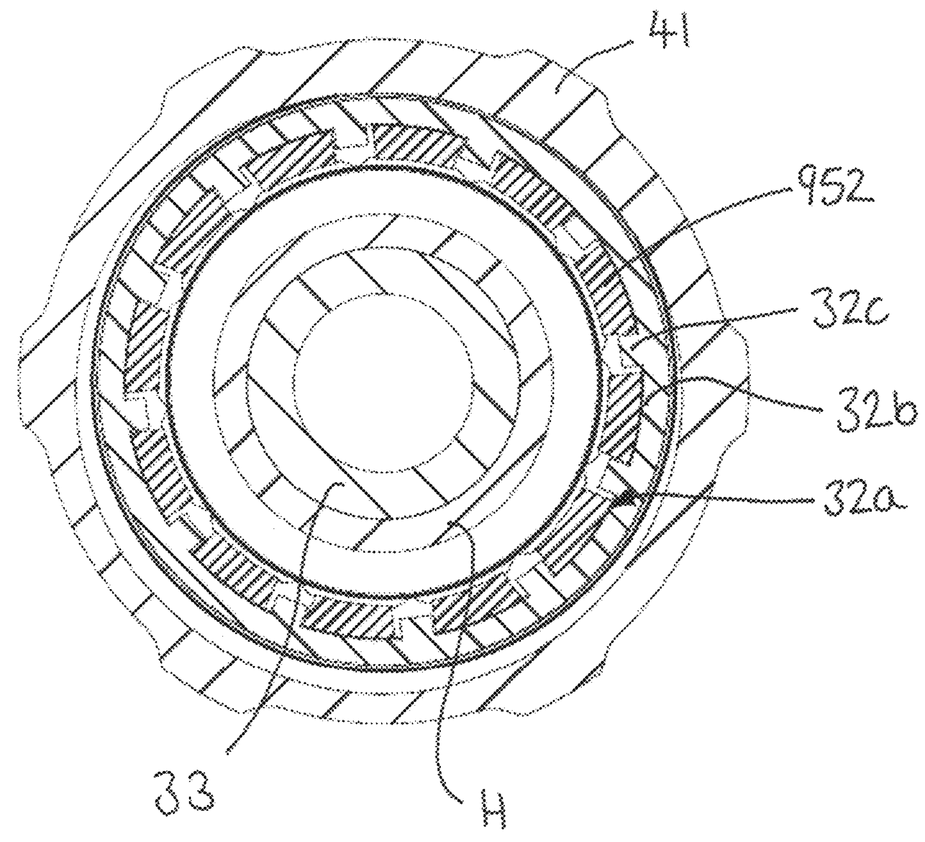
FIG. 11 is a section on line XI-XI of the garden hose fitting shown in FIG. 9.

FIGS. 9, 10, and 11 show a fourth alternative garden hose fitting which is similar to that shown in and described with reference to FIGS. 1 to 5. Description of the parts of the first alternative garden hose fitting in common with the hose fitting of FIGS. 1 to 5 is not given herein for the sake of brevity. The difference between the garden hose fitting of FIGS. 9, 10 and 11, and that of FIGS. 1 to 5 is that a different, longer, form of modified claws 952 are provided. In this case a fourth alternative sleeve member 95 is provided which comprises the modified claws 952 and further features are provided in the hose receiving portion 32 to co-operate with the modified claws 952 as will be explained below.

In the above embodiments of FIGS. 1 to 8, the camming surface 32*a* in the hose receiving portion is relatively short and is arranged at 45 degrees to the axis of the hose receiving portion 32—which in this cases is the same as the axis of the bore B of the main body 3. In the embodiment of FIGS. 9 to 10, the camming surface 32*a*' is longer and at a shallower angle. For example the camming surface 32*a*' might be arranged at say 20 degrees to the axis of the hose receiving portion 32. A typical range for inclination of the camming surface 32*a*' might be 10 degrees to 50 degrees. Use of a lower angle of inclination of the camming surface may help with securing the hose H, whilst reducing the risk of damaging the hose and/or easing the insertion of a hose H into the hose receiving portion and/or increase the lifetime of the claws 952 by virtue of the claws 952 being subject to less severe bending.

However, an issue can arise if a lower angle of inclination is used. This generally predicates the use of longer claws 952 and with longer claws 952, the claws 952 can be at greater risk of lateral (or circumferential) bending as the locking nut 41 is tightened. In the present embodiment this risk is alleviated by the provision of a plurality of guiding channels 32*b* in the camming surface 32*a* as most clearly seen in FIG. 11. Wall portions 32*c* are provided that define the edges of the channels 32*b*. The wall portions 32*c* resist lateral movement of the claws 952 as the locking nut 41 is tightened and the claws 952 move axially along the channels 32*b*.

In alternatives the channels may have flared mouth portions (or as might be described an entrance chamfer) for receiving and then guiding the claws 952 into a correct angular position relative to the main body 3 of the fitting as the locking assembly 4 including the claws 952 is mounted onto the main body 3.

The claws 952 of the arrangement of FIGS. 9 to 11 each comprise a respective tooth portion 952*a* which again are arranged as barbs as in the cases of the arrangements of FIGS. 7 and 8.

It will be appreciated that whilst the present embodiments are in the form of a hose fitting the present type of hose connector arrangement may be used in other devices. So for example a hose connection portion 1 of the type described above might be provided directly on another garden component such as a tap or tap connector, a tank or water butt, a water outlet device such as a nozzle or hose gun, a water controller such as a water computer, or so on. In such a case this will allow a hose to be directly connected to the corresponding component.

In alternatives the claws 52/52'/52"/952 might not be carried on the locking nut 41. In such a case for example, the claws 52/52'/52"/952 might not be arranged for axial movement relative to the hose receiving portion and rather the nut 41 arranged to drive the claws 52/52'/52"/952 into engagement with a carried hose H in another fashion-say by carrying or acting on a camming portion which is arranged to act on corresponding camming portions on the claws 52/52'/52"/952.

Note also that guiding channels 32*b* of the type shown in FIGS. 9 to 10 could be provided in connector portions having claws 52/52'/52" of the type shown in FIGS. 1 to 8 if desired.

Figure 12A:
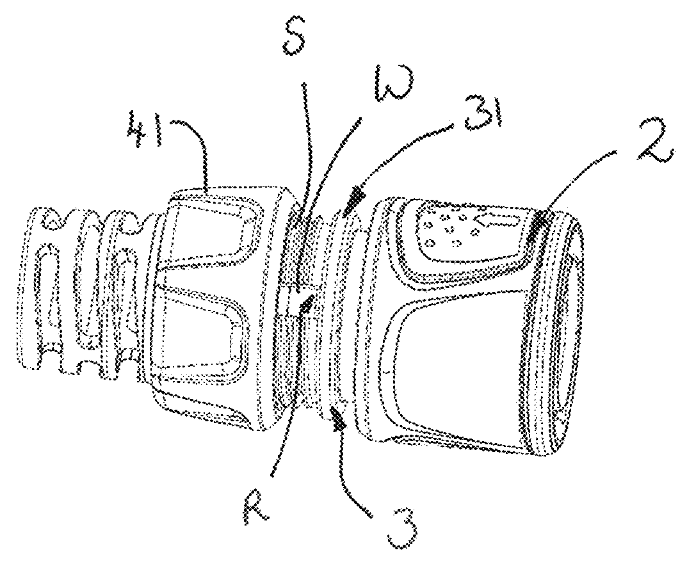
FIG. 12A schematically shows a fifth alternative garden hose fitting.
Figure 12B:
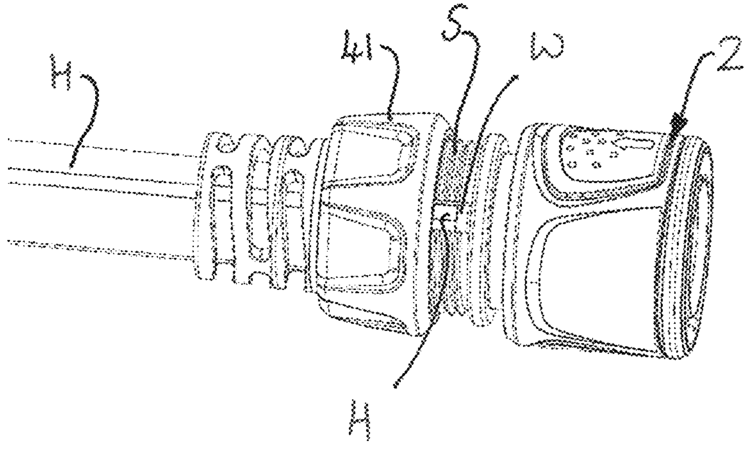
FIG. 12B shows the garden hose fitting shown in FIG. 12A mounted on a hose.

FIGS. 12A and 12B show a fifth alternative garden hose fitting which is similar to that shown in and described with reference to FIGS. 1 to 5. Description of the parts of the fifth alternative garden hose fitting in common with the hose fitting of FIGS. 1 to 5 is not given herein for the sake of brevity. The difference between the garden hose fitting of FIGS. 12A and 12B and that of FIGS. 1 to 5 is that an inspection (or viewing) window W is provided in the skirt portion S of the threaded stem portion 31 of the main body 3. In the present embodiment the inspection window W is provided in the form of an aperture (or hole) in the material of the skirt portion S.

Thus as can be seen in FIG. 12A a user can see into the interior of the main body 3 and in particular into the receiving region R which is defined between the spigot 33 and the skirt portion S.

This means that when a hose H is mounted onto the spigot 33, as shown in FIG. 12B, the end of hose H is visible, and hence it can be seen whether the hose H is correctly mounted on the spigot 33. This in turn helps ensure that the hose H is properly captured by clamping arrangement of the connector portion 1—that is, the hose H is properly clamped between the claws 52 and the spigot 33 as shown for example in FIG. 5.

Ideally, the inspection window extends over a region of the spigot 33 in which the end of an inserted hose H of the intended size or sizes is expected to reach when fully mounted onto the spigot 33. As will be appreciated this end position may depend on the original dimensions of the hose—both internal and external diameters and other factors such as material, age, prestretching and so on.

Figure 13A:
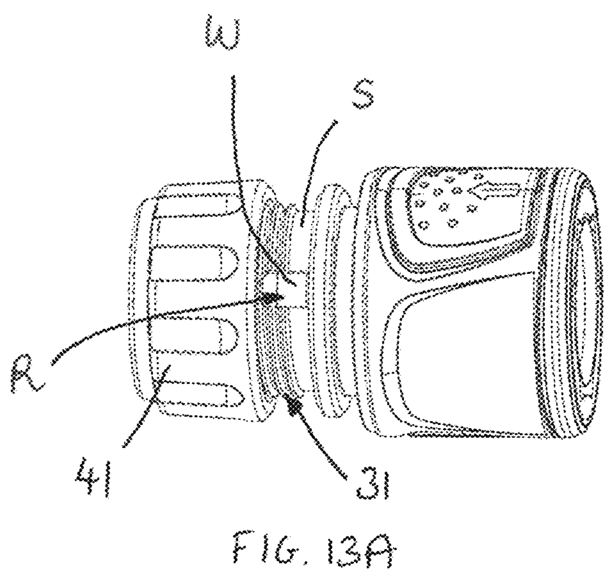
FIG. 13A schematically shows a sixth alternative garden hose fitting.

FIGS. 13A-3C show a sixth alternative garden hose fitting which is similar to that shown in and described with reference to FIGS. 12A and 12B in some respects and different in others. The same reference numerals as were used in relation to FIGS. 1 to 12A and 12B are used below in relation to corresponding parts of the fitting of FIGS. 13A-13C.

Figure 13B:
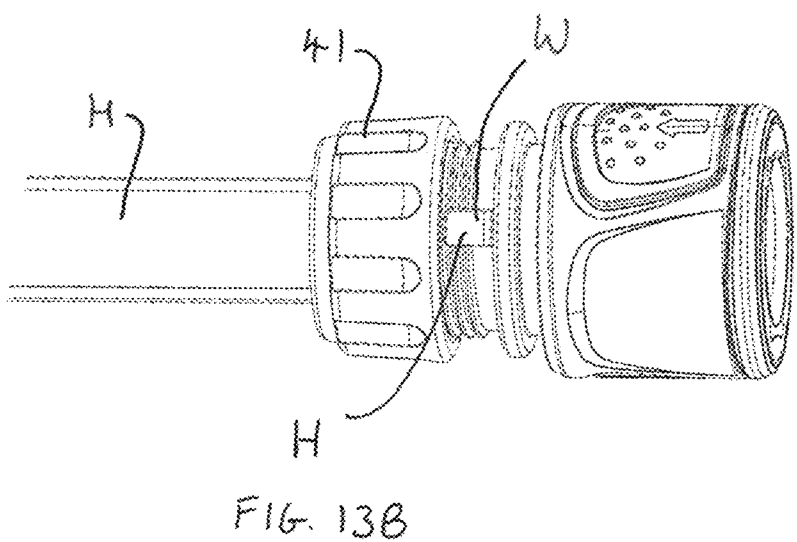
FIG. 13B shows the garden hose fitting shown in FIG. 13A mounted on a hose.
Figure 13C:
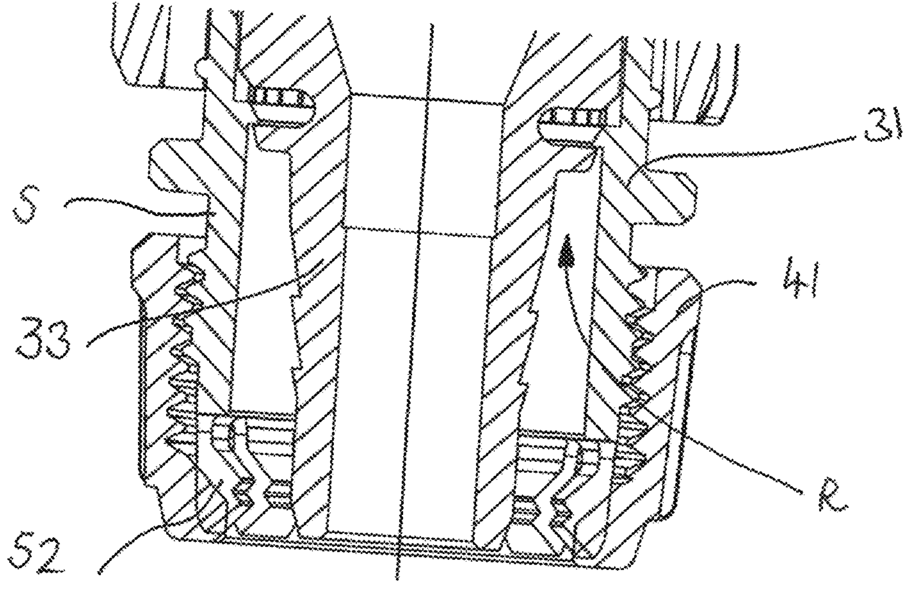
FIG. 13C is a partial sectional view of the garden hose fitting shown in FIGS. 13A and 13B.

The fitting of FIGS. 13A-13C is similar to that of FIGS. 12A and 12B in that it includes a inspection window W provided in a skirt portion S of a threaded stem 31 to allow viewing of a hose H when properly mounted onto a spigot 33 and in a hose receiving region R.

On the other hand, this hose fitting differs from that of FIGS. 1 to 12A and 12B in that it includes more conventional forward facing claws 52 (see FIG. 13C).

As shown in FIG. 13C (which is taken on a section that does not show the inspection window W), the fitting comprises a spigot 33, threaded stem 31, claws 52 for clamping into hose H when carried on the spigot 33 and a nut 41 for driving the claws 52 into engagement with a carried hose H. Thus in these respects the fitting is similar to that of the fittings described further above. However, the claws 52 are provided at the end of the threaded stem 31 and face forward or outwardly unlike those in the fittings described further above.

Notwithstanding these differences, then as mentioned above, there is a hose receiving region R defined between a skirt portion S and the spigot 33. Moreover, when a hose H is properly mounted on spigot 33 and in this region R it is visible through the inspection window W as shown in FIG. 13B.

Thus the same benefits and advantages of the inspection window can be obtained in fittings of this type having forward facing claws 52, as with fittings having inward facing claws 52 as shown in FIGS. 12A and 12B.

The invention claimed is:

1. A garden hose connector arrangement comprising a hose connection portion for accepting the end of a garden hose, the hose connection portion comprising:

a hose receiving portion in which is disposed a spigot for receiving the end of a length of hose, the hose receiving portion having a distal end via which hose is received in use and, opposite the distal end, a proximal end; and a clamping arrangement comprising a locking nut and a sleeve member, the sleeve member being carried on the locking nut and comprising a collar portion and a plurality of deformable claws which surround the spigot and are joined to the collar portion, wherein the deformable claws are arranged to be driven into contact with hose carried on the spigot under action of the locking nut such that a carried hose is clampable between the claws and the spigot, wherein the hose connection portion has a hose introduction end via which hose is introduced onto the spigot in use, a skirt portion is provided around the spigot so as to define a hose receiving region between the skirt portion and the spigot, and an inspection window is provided in the skirt portion to enable viewing of a hose end when introduced onto the spigot and into the hose receiving region, wherein the claws have first end portions via which the claws are joined to the collar portion and second engaging end portions for biting into a carried hose and the second end portions of the claws are closer to the proximal end of the hose receiving portion than are the first end portions of the claws, so that the claws project inwardly into the hose connection portion to yield reverse facing claws.

2. A garden hose connector arrangement according to claim 1 in which the inspection window is provided as an aperture in the skirt portion.

3. A garden hose connector arrangement according to claim 1 in which the inspection window is provided in the skirt portion in a location that is towards a proximal end of the spigot.

4. A garden hose connector arrangement according to claim 1 which is a garden hose fitting and further comprises a connector mounting portion for accepting a connector portion of a component to be connected to the hose fitting.

5. A garden hose connector arrangement according to claim 4 in which the connector mounting portion comprises part of a push fit connector system for accepting and retaining a part of the connector portion of a component to be connected to the hose fitting.

6. A garden hose connector arrangement according to claim 1 in which the locking nut is rotatably mounted on the sleeve member for rotation around an axis of the sleeve member and the locking nut and sleeve member are arranged so that as the locking nut is tightened onto a main body of the hose connection portion, the sleeve member is driven axially relative to the main body of the hose connection portion whilst the locking nut is able to rotate relative to the sleeve member.

7. A garden hose connector arrangement according to claim 1 in which each claw is joined to the collar portion via a respective plastic hinge portion.

8. A garden hose connector arrangement according to claim 1 in which each claw is joined to the collar portion via a respective plastic hinge portion and arranged to bend around the plastic hinge portion into gripping contact with a carried hose.

9. A garden hose connector arrangement according to claim 1 in which the sleeve member is of one piece.

10. A garden hose connector arrangement according to claim 1 in which the sleeve member comprises a hose expansion retainer.

11. A garden hose connector arrangement according to claim 1 in which the locking nut is assembled on the sleeve member by elastic deformation of the sleeve member and/or the locking nut, or the locking nut and sleeve are manufactured as one component.

12. A garden hose connector arrangement according to claim 1 in which each claw comprises at least one tooth portion for biting into a carried hose.

13. A garden hose connector arrangement according to claim 12 in which the at least one tooth portion is arranged as a barb.

14. A garden hose connector arrangement according to claim 1 which is arranged to accept hoses of a plurality of different sizes.

15. A garden hose connector arrangement according to claim 1 in which the hose receiving portion comprises a camming surface for acting on the claws in driving the claws towards the spigot.

16. A garden hose connector arrangement according to claim 15 in which the camming surface comprises a slope portion which is inclined to an axis of the hose receiving portion.

17. A garden hose connector arrangement according to claim 16 in which an angle of inclination of the slope portion relative to the axis of the hose receiving portion is in the range of 10 degrees to 50 degrees.

18. A garden hose connector arrangement according to claim 15 in which the camming surface comprises at least one guide portion for resisting circumferential movement of the claws as the locking nut is tightened and the claws move axially along the camming surface.

19. A garden hose connector arrangement according to claim 18 in which the at least one guide portion comprises at least one guiding channel.

20. A garden hose connector arrangement according to claim 19 in which the at least one guiding channel has a flared mouth portion for receiving and then guiding the claws into a correct angular position relative to the main body of the connection portion as the locking assembly including the claws is mounted onto the main body.

21. A garden hose connector arrangement assembly comprising a garden hose connector arrangement according to claim 1 with a length of hose mounted in the hose receiving portion.

* * * * *